United States Patent [19]

Mailloux

[11] Patent Number: 5,555,557
[45] Date of Patent: Sep. 10, 1996

[54] BIT-MAP IMAGE RESOLUTION CONVERTER WITH CONTROLLED COMPENSATION FOR WRITE-WHITE XEROGRAPHIC LASER PRINTING

[75] Inventor: Louis D. Mailloux, Fairport, N.Y.

[73] Assignee: Xerox Corporation, Stamford, Conn.

[21] Appl. No.: 338,981

[22] Filed: Nov. 14, 1994

Related U.S. Application Data

[63] Continuation of Ser. No. 890,064, May 28, 1992, abandoned, which is a continuation-in-part of Ser. No. 588,125, Sep. 25, 1990, Pat. No. 5,410,615, which is a continuation of Ser. No. 513,415, Apr. 23, 1990, Pat. No. 5,282,057.

[51] Int. Cl.$^6$ ............................................. G06K 9/42
[52] U.S. Cl. .................................. 382/299; 382/298
[58] Field of Search .............................. 382/300, 298, 382/299, 308, 307, 293; 358/451, 447

[56] References Cited

U.S. PATENT DOCUMENTS

| | | | |
|---|---|---|---|
| 4,347,122 | 3/1984 | Walsh et al. | 358/166 |
| 4,569,081 | 2/1986 | Mintzer et al. | 382/47 |
| 4,630,947 | 12/1986 | Yoshida et al. | 358/451 |
| 4,632,579 | 12/1986 | Takano et al. | 400/121 |
| 4,698,778 | 10/1987 | Ito et al. | 358/451 |
| 4,700,201 | 10/1987 | Sato | 346/108 |
| 4,742,553 | 5/1988 | Irwin | 382/47 |
| 4,821,333 | 4/1989 | Gillies | 382/55 |
| 4,827,352 | 5/1989 | Yoneda et al. | 358/287 |
| 4,841,375 | 6/1989 | Nakajima et al. | 353/280 |
| 4,847,641 | 7/1989 | Tung | 346/154 |
| 4,872,064 | 10/1989 | Tutt et al. | 382/47 |
| 4,907,152 | 3/1990 | Lempriere | 382/47 |

FOREIGN PATENT DOCUMENTS

| | | | |
|---|---|---|---|
| 162259A2 | 11/1985 | European Pat. Off. | G06K 15/12 |
| 359463A2 | 3/1990 | European Pat. Off. | H04N 1/40 |
| 385508A3 | 9/1990 | European Pat. Off. | G09G 1/14 |

OTHER PUBLICATIONS

Partial European Search Report and Annex, EP 93 30 4205, dated Oct. 20, 1993.

*Primary Examiner*—Yon J. Couso
*Attorney, Agent, or Firm*—R. Christine Jacobs

[57] ABSTRACT

A method is shown to enable the conversion of binary image data originally generated at a first resolution into representative binary image data of an integer-value magnified resolution. Included within the resolution conversion method are methods which tend to smooth transitional edges, compensate for the conversion of an image optimized for write-black printing system to a write-white printing system, and improve the rendition of graphics images and reverse printing.

8 Claims, 6 Drawing Sheets

BIT-MAP IMAGE RESOLUTION CONVERTER WITH CONTROLLED COMPENSATION FOR WRITE-WHITE XEROGRAPHIC LASER PRINTING

CROSS REFERENCE TO RELATED APPLICATIONS

This is a continuation of application Ser. No. 07/890,064, filed May 28, 1992 now abandoned, which application is a continuation-in-part of coassigned U.S. patent application No. 07/588,125 of Louis D. Mailloux, entitled "BIT-MAP IMAGE RESOLUTION CONVERTER COMPENSATING FOR WRITE-WHITE XEROGRAPHIC LASER PRINTING," filed Sep. 25, 1990, now U.S. Pat. No. 5,410,615 which is a continuing application of coassigned U.S. patent application Ser. No. 07/513,415 of Louis D. Mailloux et al., entitled "BIT-MAP IMAGE RESOLUTION CONVERTER," filed Apr. 23, 1990, now U.S. Pat. No. 5,282,057 both of which are herein incorporated by reference.

FIELD OF THE INVENTION

The present invention generally relates to a system for converting bit-map images from a first resolution to a second resolution, particularly where the second resolution will be printed using a line-thinning printer technology. More specifically, the invention relates to improved techniques for reverse-printing and graphics rendition in bit-map image resolution conversion on a high resolution write-white printer.

BACKGROUND OF THE INVENTION

It is a generally known requirement of certain computer graphic output devices to convert the resolution of digital input images prior to outputting them at a predefined output resolution (pixel density or raster density). Specifically, printer systems capable of printing image data and/or character data have become widely used. Furthermore, printer systems of this type currently provide high resolution, e.g., 600 spots per inch (spi) output capabilities which, in many cases, is higher than the input resolution available. This results in a situation where the performance of the printer may not be used to the maximum. For example, many existing input scanners and personal computer software packages operate at a medium image resolution of 300 spi, resulting in either an incompatibility with higher resolution printers, or underutilization of the output capabilities of high resolution printers.

For these reasons, current technology is focused upon means for conversion of image data of one resolution to an image of a second resolution. It is a commonly known practice to implement this type of conversion through simple pixel and raster level operations, such as pixel doubling. Alternatively, more elaborate methods have been developed to facilitate this type of conversion.

Takano et al., U.S. Pat. No. 4,632,579, discloses a method of increasing print resolution for a pin matrix printer by mechanically altering the relative position of the print head with respect to the paper during subsequent printing passes to increase the output resolution of the printer. Also disclosed is a means for controlling the activation of printing pins using a microprocessor based interpolation scheme to synthesize a secondary dot matrix pattern based upon a primary dot matrix pattern contained in memory for the associated character or pattern.

Nakajima et al., U.S. Pat. No. 4,841,375, teaches an image resolution conversion apparatus for converting the pixel density of image data, comprising an input means for receiving image data, a selection means to determine the appropriate pixel-density conversion ratio, and a pixel-density converting means. The pixel-density converting means comprises, inter alia, a conversion-pixel density operating means for calculating a conversion-pixel density based on the input pixel data and a binary encoding means for subsequently applying a threshold to the conversion-pixel density value and generating a conversion-pixel binary output. Also disclosed is a threshold-value setting means which dynamically adjusts the threshold value to be applied within the binary encoding means on the basis of pattern detection applied to the original or reference image data.

Others have proposed template matching techniques for more precisely controlling the size, positioning and number of pixels that are printed on a xerographic photoreceptor to render bit-mapped images.

Walsh et al., U.S. Pat. No. 4,437,122, describes a method of enhancing the resolution and quality of characters of a system receiving video display pixel information and providing hard copy output. The system accomplishes this by storing at least three successive lines of video data in successive parallel connected shift registers, applying the output of the shift registers to a decoder, and generating driving signals for a printer head. The decoder compares the pixels on the same line as well as in preceding and succeeding lines that surround each specific input pixel to generate the printer head driving signal according to whether straight or curved line segments are to be formed. Enhancement of the central pixel may be determined by progressively examining an ordered table of matches to find an equivalent image and its related enhancement.

A particular problem arises in the resolution conversion of bit-map images where the images have been previously optimized for a specific printing technology. "Write-black" refers to an electrophotographic printing process in which the portions of the image that will attract black toner for eventual transfer to a copy substrate are discharged with an exposure device, such as a laser. By contrast, "write-white" refers to an electrophotographic printing process in which the portions of the image that will not receive toner are discharged with an exposure device.

Thus, for example, images may be optimized for write-black printer technology, which tends to thicken lines because the optical input has a width greater than the pixel width, and subsequently transmitted to a write-white printer, which tends to thin lines because the discharged areas adjacent to lines areas spread into the domain of the line. Such images will appear undesirably lighter, because the correction for the expected write-black printer thins the lines m the image. When such a corrected image is sent instead to a write-white printer, the result will be lines that are too thin. Single pixel lines will tend to be invisible. Another effect that might be present in an optimized image might be halfbitting, which may not be required in a higher resolution image.

Mailloux, U.S. patent application Ser. No. 07/588,125, now U.S. Pat. No. 5,410,615 discloses a method for conversion of binary image data into representation binary image data at an integer-multiple higher resolution depending upon the capabilities of the printer, e.g., 2x, 3x, 4x, etc. In the process of conversion of binary image data originally generated at a lower resolution and optimized For a particular printer technology, an amount of line thickening, or dilation, is provided which corrects the bit-map for reproduction in a printer having line thinning characteristics, such as a write-white printer. The dilation function may be performed by the application of state rules to the magnification which tend to favor line thickening. The expanding magnification method, illustrated by the 2x method as described in Mailloux, improves printing of fine lines, but tends to lighten reverse printing and fill in shadow areas.

It is an object of this invention to convert bit-map images, originally generated at a first resolution and optimized for a particular printer technology, to a second resolution for a printer having different characteristics, providing controlled dilation, wherein the controls assist in retaining discernible features of fine lines and graphic images.

SUMMARY OF THE INVENTION

In accordance with the invention, there is provided a method for the conversion of binary image data originally generated at a first resolution, optimized for a particular printer technology, into representative binary image data at an integer-multiple higher resolution. Included within the resolution conversion algorithm are methods to correct the output for reproduction on a printer having different reproduction characteristics and methods to improve the rendition of graphics images and reverse printing.

A method of converting the resolution of an image from a first resolution to a second magnified resolution begins by storing a portion of the pixels representing a portion of the image, and isolating a region comprised of a central pixel and its surrounding pixels. An expanded array of symmetrically unique pixels is generated at the second resolution for the central pixel, and a set of state determination rules is used to determine the state of each of the symmetrically unique pixels in the magnified resolution array. The state determination rules are based on the formation of the pixels in the isolated region, and tends to favor a certain state if the formation of pixels in the isolated regions meets certain conditions.

In accordance with one aspect of the invention, there is provided a resolution conversion method which, in the process of conversion of binary image data originally generated at a lower resolution and optimized for a particular printer technology into representative binary image data at an integer-multiple higher resolution, provides an amount of line thickening, or "dilation," for correcting the bit-map for reproduction in a printer having line thinning characteristics. The method additionally contains controlling restrictions so that the discernible features of graphic images are preserved. The controlled dilation function may be performed by the application of state rules to the magnification process which tend to favor line thickening. The rules may be asymmetric about a magnified pixel. Restrictions to the magnification process are added to the rules to improve the rendition of shadows and reversed printing over previous methods. The 2x rules for smoothing and dilation, as described in Mailloux 07/588,125, now U.S. Pat. No. 5,410,615 are modified to "2×4 W" in the present invention, which require a white surround "control field" of at least 3 white pixels adjacent to a white center pixel before representative binary data for the center pixel may be altered to permit dilation of black fields.

The following description, the drawings and the claims further set forth these and other objects, features and advantages of the invention.

DETAILED DESCRIPTION

A. Features of the Invention

Figure 1:
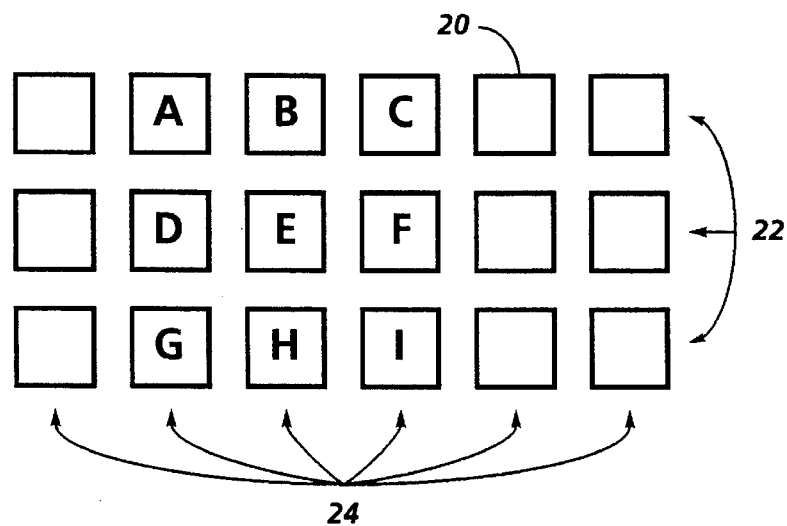
FIG. 1 is an illustration of a representative portion of an input raster image.

Referring now to the drawings, FIG. 1 shows a representative segment of image data. Specifically, the segment consists of a plurality of binary image pixel positions 20, generally arranged horizontally into rows or scan lines 22. In addition, pixels 20 are arranged vertically into columns of pixels 24 so as to form an addressable matrix of image pixels. Hereinafter, all references to the binary state of an image pixel are intended to imply a white or black condition of the pixel.

In accordance with the present invention, the magnification, or equivalently, the resolution conversion, of the image is implemented pixel by pixel, based upon neighboring image pixels. With reference to the 3-scan line by 3-pixel (3×3) array of original image pixels in FIG. 1, denoted alphabetically as pixels A through I, a center pixel E may be magnified by an integral multiple based upon the relative binary states of neighboring pixels A, B, C, D, F, G, H and I. The default binary state for the output pixel is determined by the binary state of the center pixel E. Alteration of the default state is based upon the binary states of neighboring pixels and the relationships between sub-groups of neighboring pixels, including the number and positions of black and white pixels. Definition of the 3×3 original image array allows the generation of specific rules which may be applied symmetrically to all pixels to be generated from center pixel E.

Figure 2:
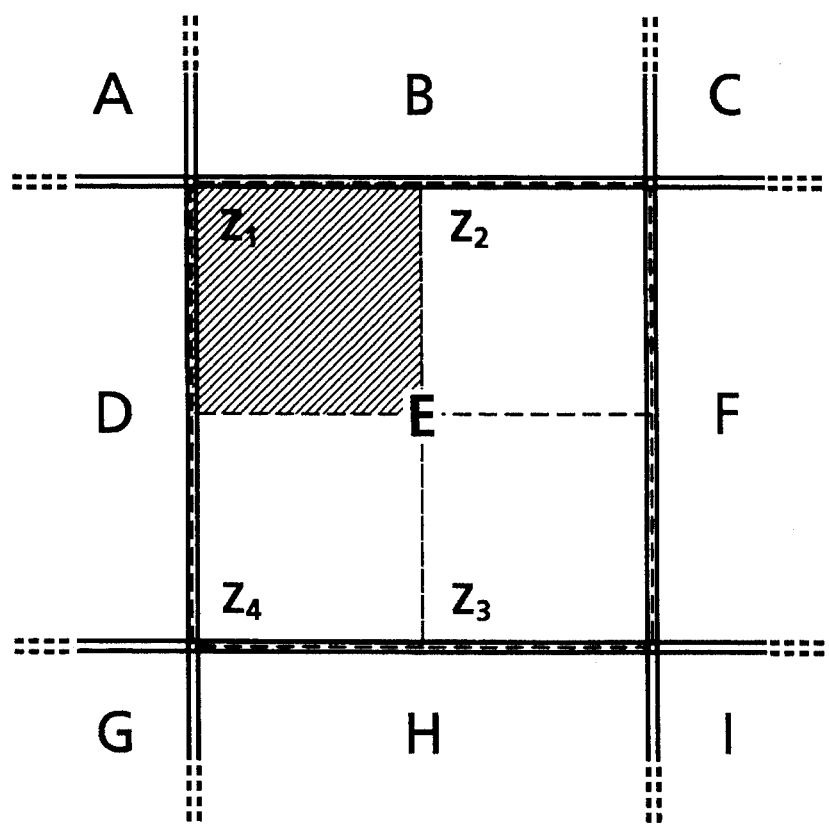
FIG. 2 is a detailed illustration of a 2×4 W magnification method of the present invention.

FIG. 2 depicts the center "parent" pixel E of FIG. 1, in an enlarged view with four symmetrically unique magnified output pixels $Z_1$, $Z_2$, $Z_3$, $Z_4$ superimposed to represent symmetrically unique magnification pixels of the output of a 2×4 W magnification operation. Determination of the binary state of each of the symmetrically unique magnification pixels is made based on the binary state of original pixel E and the original surrounding pixels.

The 2×4 W magnification state determination rules, as described below, are extensible to larger magnification levels. In the case of a 2×4 W magnification, the rules require that if the center pixel being corrected is white, a "control field" of at least four adjacent pixels, including the center pixel, also be white for any of the magnified pixels $Z_1$, $Z_2$, $Z_3$, $Z_4$ to be made black. Obtaining black magnification pixels from a white parent pixel may effectively smooth edges or dilate a black field to compensate for write-white printing. Controlling the conditions necessary for dilation by requiring a control field of white pixels when two or more black fields are near each other, may effectively improve the rendition of small or thin white fields so that discernible fields of black or white pixels are effectively rendered in the magnified image. The rules also allow the magnification pixels for a black parent pixel to be made white where necessary to smooth edges.

For 2×4 W magnification, the binary state of symmetrically unique output pixels $Z_1$, $Z_2$, $Z_3$, or $Z_4$ is made according to application of the following state determination rules:

For $Z_1$:
If pixels (A,B,C,D,F) are white and pixels (E,G,H,I) are black; or
  if pixels (G,D,A,H,B) are white and pixels (E,I,F,C) are black; or
  if pixels (I,H,G,F,D) are black and pixels (E,C,B,A) are white; or
  if pixels (C,F,I,B,H) are black and (E,A,D,G) are white;
make output pixel ($Z_1$) white; or
if pixels (C,F,I,B,A) are black and (E,H,D,G) are white; or
if pixels (H,I,D,G) are black and (E,F,B,C) are white; or
if pixels (A,B,C,D,G) are black and (E,F,H,I) are white; or
  if pixel (A) is black and (C,E,F,G,H,I) are white; or
  if pixel (B) is black and (E,G,H,I) are white; or
  if pixel (D) is black and (E,C,F,I) are white; or
if pixels (C,E,F,A,B) are white and (H,I,D,G) are black; or
if pixels (B,D,E,F,G,H,I) are white and (A,C) are black; or
  if pixels (A,G) are black and (B,C,D,E,F,H,I) are white;
make output pixel ($Z_1$) black;
otherwise $Z_1$=E.

For $Z_2$:
If pixels (C,F,I,B) are black and pixels (E,H,D,G) are white; or
  if pixels (C,F,I,B,H) are black and pixels (E,A,D,G) are white; or
  if pixels (A,B,C,D,G) are black and pixels (E,F,H,I) are white; or
  if pixels (I,D,E,G,H) are white and pixels (A,B,F) are black; or
  if pixels (A,D,E,G,H) are white and pixels (B,F,I) are black; or
  if pixels (C,E,F,H,I) are white and pixels (A,B,D,G) are black; or
  if pixels (C,E,F,H,I) are white and pixels (B,D,G) are black; or
  if pixels (B,D,E,F,G,H,I) are white and pixels (A,C) are black; or
  if pixel (B) is black and pixels (E,G,H,I) are white; or
  if pixels (G,D,A,H,B) are black and pixels (E,I,F,C) are white; or
make output pixel ($Z_2$) black; or
if pixels (A,B,C,D,F) are white and pixels (E,G,H,I) are black; or
  if pixels (G,D,A,H,B) are white and pixels (E,I,F,C) are black;
make output pixel ($Z_2$) white;
otherwise $Z_2$=E.

For $Z_3$:
If pixels (H,I,D,G) are black and pixels (E,F,B,C) are white; or
  if pixels (E,F,G,H,I) are white and pixels (A,B,C,D) are black; or
  if pixels (C,E,F,A,B) are white and pixels (H,I,D,G) are black; or
  if pixels (G,D,A,H,B) are white and pixels (E,I,F,C) are black; or
  if pixels (A,B,C,D,G) are black and pixels (E,F,H,I) are white; or
  if pixels (I,H,G,F,D) are black and pixels (E,C,B,A) are white; or
  if pixels (A,G) are black and pixels (B,C,D,E,F,H,I) are white; or
  if pixel (D) is black and pixels (E,C,F,I) are white; or
  if pixels (A,B,C,D,F) are black and pixels (E,G,H,I) are white;
make output pixel ($Z_3$) black;
otherwise $Z_3$=E.

For $Z_4$:
If pixels (A,B,C,D,F) are black and pixels (E,G,H,I) are white; or
  if pixels (I,H,G,F,D) are black and pixels (E,C,B,A) are white; or
  if pixels (G,D,A,H,B) are black and pixels (E,I,F,C) are white; or
  if pixels (C,F,I,B,H) are black and pixels (E,A,D,G) are white; or
  if pixels (B,D) are black and pixels (I,E) are white, and (C,F) are white or (G,H) are white; or
  if pixels (B,F) are black and pixels (D,E,G,H) are white, and (I) is white or (A) is white; or
  if pixels (D,H) are black and pixels (E,C) are white, and (A,B) are white or (F,I) are white; or
  if pixels (F,H) are black and pixels (E,A) are white, and (D,G) are white or (B,C) are white;
make output pixel ($Z_4$) black;
otherwise $Z_4$=E.

Figure 3A:
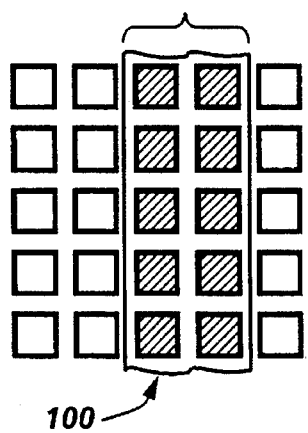
FIGS. 3(a) and 3(b) are, respectively, an illustrative example of a portion of an input image, and the resultant 2×4 W magnification of the image represented by FIG. 3(a) in accordance with the present invention.
Figure 3B:
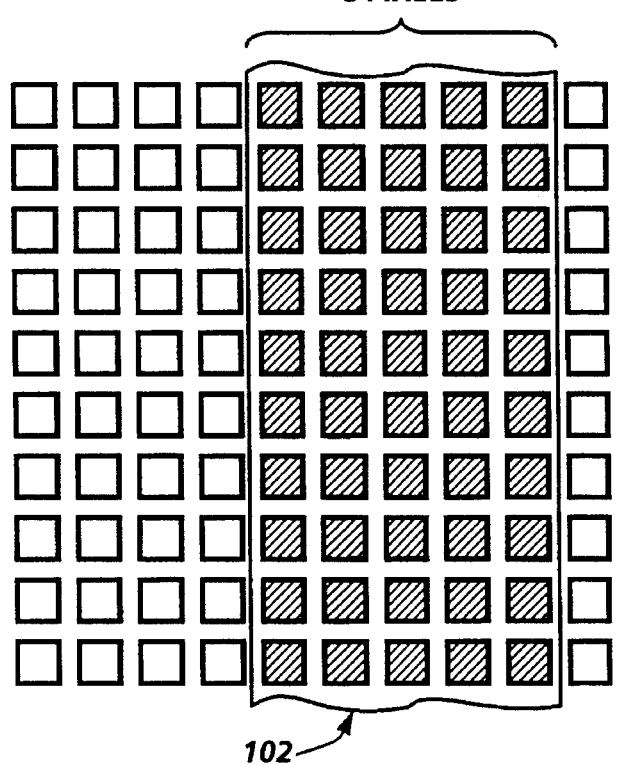

Referring now to FIGS. 3(a) and 3(b), examples of input image and output images respectively, FIG. 3(a) is intended to depict a representative portion 100 of an input image, possibly a thin black vertical line extending beyond the edges of the sample. FIG. 3(b) depicts the resultant output image 102 after 2×4 W magnification in accordance with the present invention. It will be noted that while a simple bit doubling routine commonly used for resolution conversion would have made the two-pixel-thick line four pixels thick, the inventive resolution conversion process takes into account thinning noted in the printing of images optimized for write-black processor to a write-white process, and thickens the image by an additional pixel width. While an image optimized for a write-black printer converted with a bit doubling process would tend to be washed out in appearance when printed on a write-white printer (because the printed lines are relatively thinner) the thickened lines resulting from the invention dilation process retain their dark appearance. The bit-map thickness is increased by about 25%, at least a portion of which increase compensates for the line thinning noted in the write-white printing. In a part of an image where there is only one black field, the 2×4 W magnification method produces results similar to that of 2x magnification as described in Mailloux 07/588,125.

Figure 4A:
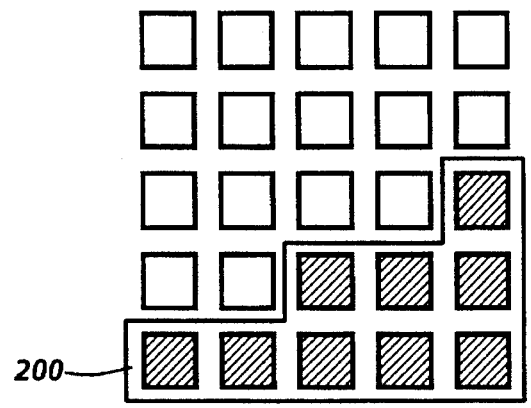
FIGS. 4(a) and 4(b) illustrate, respectively, another example of a portion of an input image, and the resultant 2×4 W magnification of the image represented by FIG. 4(a) in accordance with the present invention.
Figure 4B:
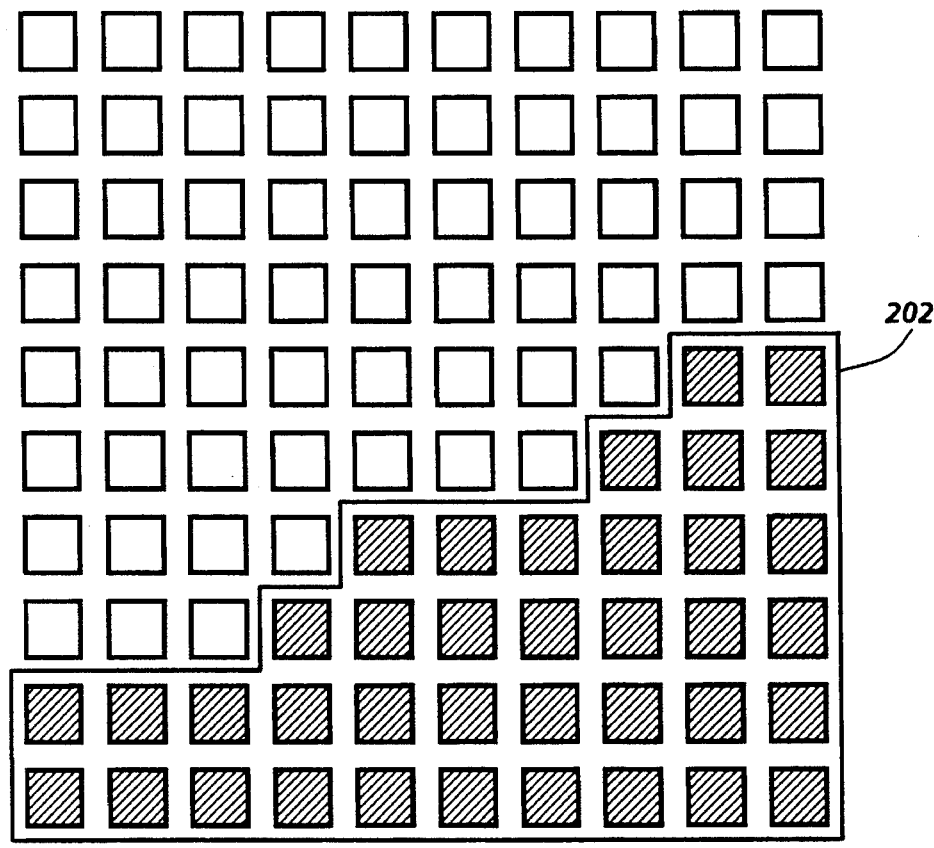

FIGS. 4(a) and 4(b) together illustrate an example of the smoothing capabilities of the resolution conversion technique in accordance with the present invention at regions in an image having a state transition. Shaded pixels 200 form an angled edge at the black-to-white transition area. As described previously, resolution conversion of this type of an edge may result in the formation of "jaggies" along the edge if no smoothing is applied. The jaggies are the direct result of the magnification of the inherent step type representation of an angled edge. While it is not possible to completely remove the jaggies from the higher resolution image, the visual impact of the jaggies is reduced to a more acceptable level. Pixels 202 of FIG. 4(b) represent the converted output of the input image of FIG. 4(a), using a conversion factor of 2×4 W in accordance with the present invention. The converted image portion will have some enhanced pixels filled in by black that would otherwise be white because the original parent pixel that was magnified was white. The resultant steps seen in the black-to-white transition of FIG. 4(b), while perceptible at the size presented, would be inherently less perceptible when produced at approximately one half of the present scale. In other words, if FIG. 4(b) had been produced at a 2×4 W higher resolution in a such a manner so as to maintain the same size of the original image area of FIG. 4(a), the step height of the black-to-white transitional edge would be one half of that evident in the original image, FIG. 4(a). The effect is to smooth the state transition, or edge, between the black and white fields. Again, thickening of the black pixel field to compensate for write-white printing is also accomplished in the conversion.

Figure 5A:
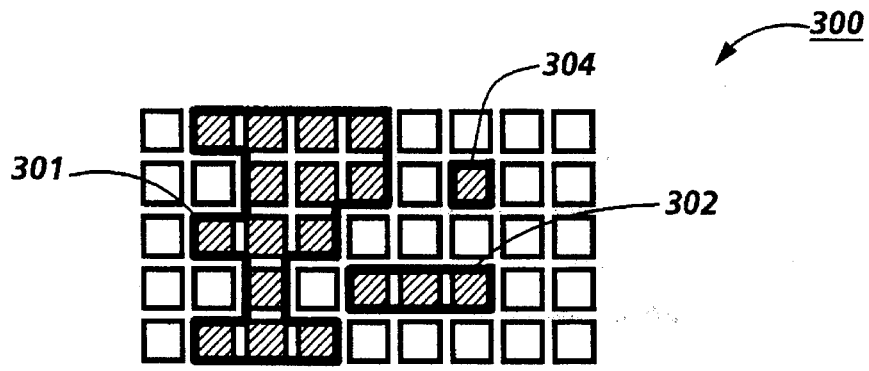
FIGS. 5(a), 5(b) and 5(c) illustrate, respectively, an example of a portion of an input image such as a portion of a bit-map graphic image, the resultant 2x magnification of the image represented by FIG. 5(a) in accordance with prior conversion methods, and the resultant 2×4 W magnification of the image represented by FIG. 5(a) in accordance with the present invention.
Figure 5B:
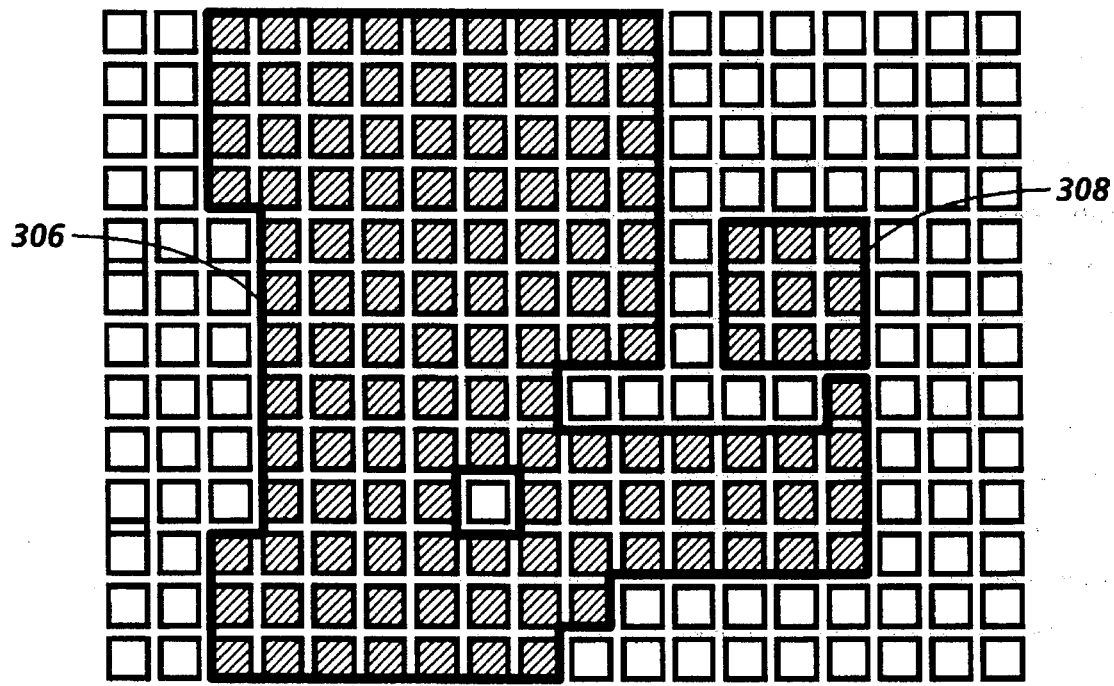
Figure 5C:
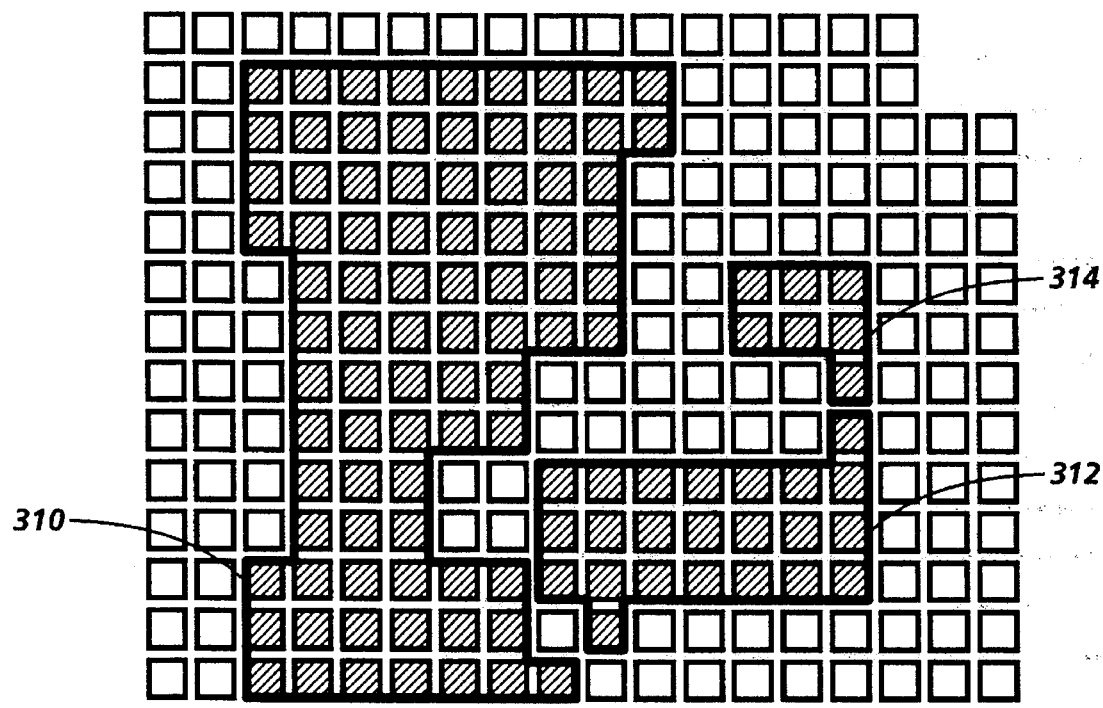

FIGS. 5(a), 5(b) and 5(c) illustrate another feature of the invention. In FIG. 5(a) a portion of a bit-map 300 is shown. Shaded pixels form fields of black pixels 301, 302 and 304 in the bit-map. A configuration of black fields as shown in FIG. 5(a) might be found in a graphics image such as a half-tone image. Prior methods of converting bit-map images to higher resolutions, such as the 2x method described in copending, coassigned U.S. patent application No. 07/588,125, previously incorporated, tend to have problems with neighboring fields of shaded areas. An example is shown in FIG. 5(b), which shows the converted output of the input image from 5(a) converted according to the 2x method. In FIG. 5(b), pixel fields 301 and 302 run together by 2x conversion, as shown by field 306. Pixel field 308, which is derived from field 304, is separated from field 306 by a single pixel wide white region. If FIG. 5(b) had been produced in such a manner so as to maintain the same size of the original image area of FIG. 5(a) at the resolution shown in FIG. 5(b), the shapes of the fields shown in FIG. 5(a) would be difficult to detect, and the single pixel separation of pixel field 308 from pixel field 306 would be obscured, so that the area would be observed as totally black.

FIG. 5(c) represents the converted output of the input image of FIG. 5(a) using 2×4 W controlled dilation conversion in accordance with the present invention. By controlling the dilation of black fields which are near other black fields, the rendition of the shapes of black fields is improved. If FIG. 5(c) had been produced in such a manner so as to maintain the same size of the original image area of FIG. 5(a) at the resolution shown in FIG. 5(c), the shapes of fields 301, 302 and 304 shown in FIG. 5(a) would be discernible as fields 310, 312, and 314 in FIG. 5(c). Shadow rendition, for example, is improved by the method of the invention as shown.

Figure 6A:
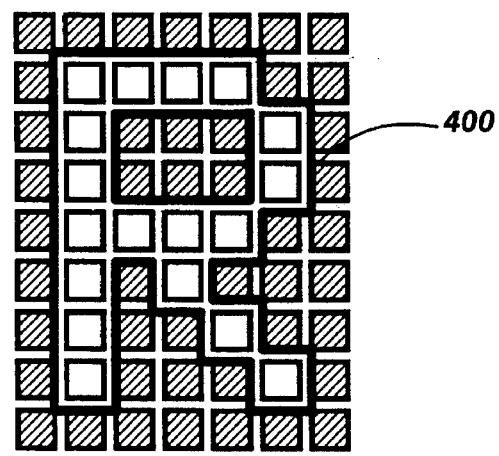
FIGS. 6(a), 6(b) and 6(c) illustrate, respectively, another example of a portion of an input image such as a reverse printing character, the resultant 2x magnification of the image represented by FIG. 6(a) in accordance with prior conversion methods, and the resultant 2×4 W magnification of the image represented by FIG. 6(a) in accordance with the present invention.
Figure 6B:
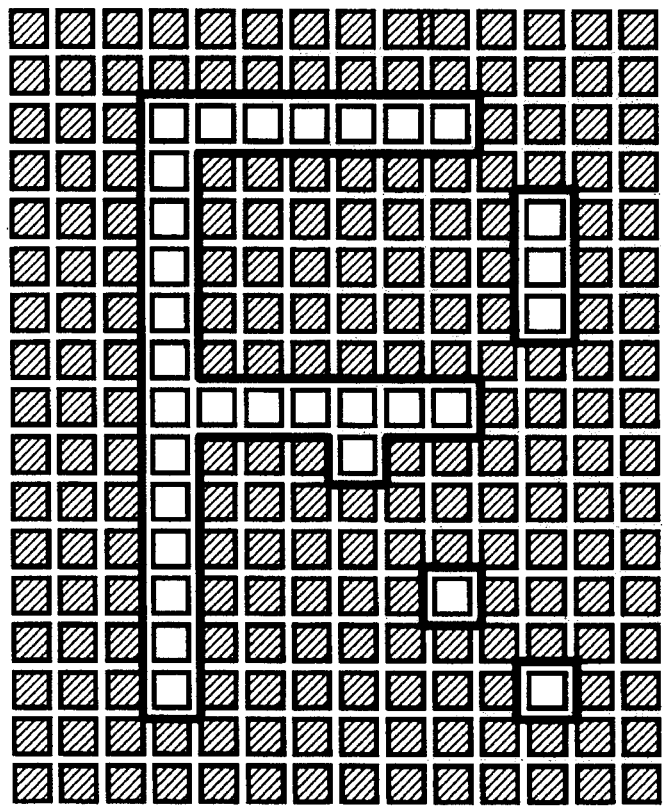
Figure 6C:
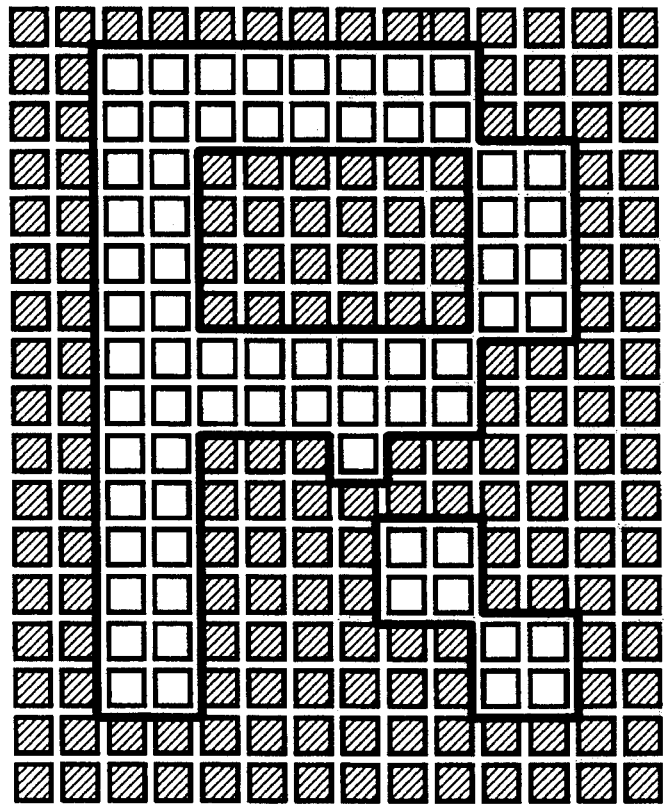

FIGS. 6(a), 6(b), and 6(c) illustrate another example of the improved capabilities of the controlled resolution conversion technique in accordance with the present invention.

In FIG. 6(a) a portion of a bit-map image 400 is shown. In this case, it is a character "R" in reverse printing—that is, the background is black, and the character is white. FIG. 6(b) shows a reverse printing character converted according to the 2x method. The 2x method, as discussed previously, dilates black areas to compensate for write-white printing. If FIG. 6(b) had been produced in such a manner so as to maintain the same size of the original image area of FIG. 6(a) at the resolution shown in FIG. 6(b), the character "R" would tend to be undetectable due to so much of the character being filled in. This is a common problem with dilation methods.

FIG. 6(c) shows the same image 400 converted using 2×4 W controlled dilation in accordance with the present invention. By controlling the dilation, which creates black magnification pixels for white parent pixels, recognizable characteristics of the character in reverse printing are preserved. If FIG. 6(c) had been produced in such a manner so as to maintain the same size of the original image area of FIG. 6(a) at the resolution shown in FIG. 6(c), the character "R" would still be distinguishable in reverse print.

B. Miscellaneous

The capability of the resolution conversion technique as demonstrated in the above description and related figures is therefore apparent. While the invention is defined in terms of two types of laser printers, it will no doubt be appreciated that other printing processes are well within the scope of the invention, where a first process might print a bit-map, optimized for printing in a second process, in a manner somewhat differently than the second process. Conversion of an image processed for a write-white printer for printing on a write-black printer, for example, is well within the scope of the invention.

Furthermore, the state determination rules may be tailored to meet the requirements of specific applications, thereby providing different capabilities as desired. Additionally, the 2×4 W conversion example hereby presented should be understood to be extensible, using the same principles as described, to other integral levels of magnification. Finally, rotation of the rules by increments of 90° is well within the scope of the invention.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of converting the resolution of an image represented by a plurality of pixels and prepared for a first printer at a first resolution to a second magnified resolution for printing at a second printer, comprising the steps of:

storing a portion of pixels of the image prepared for the first printer representing an image portion;

isolating a region of the pixels of said image portion including a pixel formation comprising a central pixel and pixels surrounding said central pixel, isolating the region of the pixels of said image by isolating a 3-pixel by 3-pixel formation of image pixels including a central pixel and pixels surrounding said central pixel;

expanding said central pixel into an array of symmetrically unique pixels representing said central pixel at a second magnified resolution for printing on the second printer; and for each of said symmetrically unique pixel positions, determining a binary pixel state according to a set of state determination rules based on the states of said pixels in said pixel formation; wherein at portions of the image having a state transition said state determination rules favor a first state over a second state for said symmetrically unique pixel positions adjacent to said state transition when a control field of adjacent pixels including said central pixel in said formation are at a second state, wherein said state determining rules further favor a first state over a second state if said control field comprises at least four adjacent pixels including said central pixel; and applying said determined binary pixel state to each of said symmetrically unique pixels, producing controlled dilation of image fields at said first state at said second resolution.

2. The method of claim 1, wherein said first state is black, and said second state is white, said state determination rules favoring controlled dilation of black fields at said second magnified resolution.

3. A method of converting the resolution of an image represented by a plurality of pixels and prepared for a first printer at a first resolution to a second magnified resolution for printing at a second printer, comprising the steps of:

storing a portion of pixels of the image prepared for the first printer representing an image portion;

isolating a region of the pixels of said image portion including a pixel formation comprising a central pixel and pixels surrounding said central pixel;

expanding said central pixel into an array of symmetrically unique pixels representing said central pixel at a second magnified resolution for printing on the second printer; and for each of said symmetrically unique pixel positions, determining a binary pixel state according to a set of state determination rules based on the states of said pixels in said pixel formation; wherein at portions of the image having a state transition said state determination rules favor a first state over a second state for said symmetrically unique pixel positions adjacent to said state transition when a control field of adjacent pixels including said central pixel in said formation are at a second state; determining the binary pixel state using the substeps of: establishing the positional relationship of each of said symmetrically unique pixel positions; and for each of said symmetrically unique pixel positions, selecting one of a plurality of unique sets of state determination rules which has been specifically established for said symmetrically unique pixel position; and applying said determined binary pixel state to each of said symmetrically unique pixels, producing controlled dilation of image fields at said first state at said second resolution.

4. The method of claim 1, wherein the steps of storing a portion of pixels, isolating a region of the pixels including a central pixel, determining for said central pixel an array of symmetrically unique pixel positions at a second magnified resolution, and determining a binary pixel state for each of said symmetrically unique pixel positions according to state determination rules are repeated for each pixel in the image.

5. A method of converting the resolution of an image represented by a plurality of pixels and prepared for a first printer at a first resolution to a second magnified resolution for printing at a second printer, comprising the steps of:

storing a portion of pixels of the image prepared for the first printer representing an image portion;

isolating a region of the pixels of said image portion including a pixel formation comprising a central pixel and pixels surrounding said central pixel, isolating the region of the pixels of said image by isolating a 3-pixel by 3-pixel formation of image pixels including a central pixel and pixels surrounding said central pixel;

expanding said central pixel into an array of symmetrically unique pixels representing said central pixel at a second magnified resolution for printing on the second printer; and or each of said symmetrically unique pixel positions, determining a binary pixel state according to a set of state determination rules based on the states of said pixels in said pixel formation; wherein at portions of the image having a state transition said state determination rules favor a first state over a second state for said symmetrically unique pixel positions adjacent to said state transition when a control field of adjacent pixels including said central pixel in said formation are at a second state; and applying said determined binary pixel state to each of said symmetrically unique pixels, producing controlled dilation of image fields at said first state at said second resolution; and wherein:

said 3-pixel by 3-pixel formation of image pixels further comprises a central pixel (E) and pixels (A, B, C, D, F, G, H, I) which are adjacent to said central pixel;

said array of symmetrically unique pixels comprises an array of pixel positions $Z_1$, $Z_2$, $Z_3$, $Z_4$ at a second magnified resolution; and said state determination rules for each of said pixel positions Z1, Z2, Z3, Z4, producing controlled dilation of a first black state are as follows:

for Z1:

if pixels (A,B,C,D,F) are white and pixels (E,G,H,I) are black; or if pixels (G,D,A,H,B) are white and pixels (E,I,F,C) are black; or if pixels (I,H,G,F,D) are black and pixels (E,C,B,A) are white; or if pixels (C,F,I,B,H) are black and (E,A,D,G) are white;

make output pixel (Z1) white; or if pixels (C,F,I,B,A) are black and (E,H,D,G) are white; or if pixels (H,I,D,G) are black and (E,F,B,C) are white; or if pixels (A,B,C,D,G) are black and (E,F,H,I) are white; or if pixel (A) is black and (C,E,F,G,H,I) are white; or if pixel (B) is black and (E,G,H,I) are white; or if pixel (D) is black and (E,C,F,I) are white; or if pixels (C,E,F,A,B) are white and (H,I,D,G) are black; or if pixels (B,D,E,F,G,H,I) are white and (A,C) are black; or if pixels (A,G) are black and (B,C,D,E,F,H,I) are white;

make output pixel (Z1) black;

otherwise Z1=E;

for Z2:

if pixels (C,F,I,B) are black and pixels (E,H,D,G) are white; or if pixels (C,F,I,B,H) are black and pixels (E,A,D,G) are white; or if pixels (A,B,C,D,G) are black and pixels (E,F,H,I) are white; or if pixels (I,D,E,G,H) are white and pixels (A,B,F) are black; or if pixels (A,D,E,G,H) are white and pixels (B,F,I) are black; or if pixels (C,E,F,H,I) are white and pixels (A,B,D,G) are black; or if pixels (C,E,F,H,I) are white and pixels (B,D,G) are black; or if pixels (B,D,E,F,G,H,I) are white and pixels (A,C) are black; or if pixel (B) is black and pixels (E,G,H,I) are white; or if pixels (G,D,A,H,B) are black and pixels (E,I,F,C) are white;

make output pixel (Z2) black; or if pixels (A,B,C,D,F) are white and pixels (E,G,H,I) are black; or if pixels (G,D,A,H,B) are white and pixels (E,I,F,C) are black;

make output pixel (Z2) white;

otherwise Z2 = E;

for Z3:

if pixels (H,I,D,G) are black and pixels (E,F,B,C) are white; or if pixels (E,F,G,H,I) are white and pixels (A,B,C,D) are black; or if pixels (C,E,F,A,B) are white and pixels (H,I,D,G) are black; or if pixels (G,D,A,H,B) are white and pixels (E,I,F,C) are black; or if pixels (A,B,C,D,G) are black and pixels (E,F,H,I) are white; or if pixels (I,H,G,F,D) are black and pixels (E,C,B,A) are white; or if pixels (A,G) are black and pixels (B,C,D,E,F,H,I) are white; or if pixel (D) is black and pixels (E,C,F,I) are white; or if pixels (A,B,C,D,F) are black and pixels (E,G,H,I) are white;

make output pixel (Z3) black;

otherwise Z3=E; and for Z4:

if pixels (A,B,C,D,F) are black and pixels (E,G,H,I) are white; or if pixels (I,H,G,F,D) are black and pixels (E,C,B,A) are white; or if pixels (G,D,A,H,B) are black and pixels (E,I,F,C) are white; or if pixels (C,F,I,B,H) are black and pixels (E,A,D,G) are white; or if pixels (B,D) are black and pixels (I,E) are white, and (C,F) are white or (G,H) are white; or if pixels (B,F) are black and pixels (D,E,G,H) are white, and (I) is white or (A) is white; or if pixels (D,H) are black and pixels (E,C) are white, and (A,B) are white or (F,I) are white; or if pixels (F,H) are black and pixels (E,A) are white, and (D,G) are white or (B,C) are white;

make output pixel (Z4) black;

otherwise Z4=E.

6. A method of converting the resolution of an image represented by a plurality of pixels and prepared for a first printer with first reproduction characteristics at a first resolution to a second magnified resolution for printing at a second printer with second reproduction characteristics, comprising the steps of:

storing a portion of pixels of the image prepared for the first printer representing an image portion;

isolating a region of the pixels of said image portion including a pixel formation comprising a central pixel and pixels surrounding said central pixel;

expanding said central pixel into an array of symmetrically unique pixels representing said central pixel at a second magnified resolution for printing on the second printer; and for each of said symmetrically unique pixel positions, determining a binary pixel state according to a set of state determination rules based on the states of said pixels in said pixel formation and said symmetrically unique pixel position;

said state determination rules including compensation for said second reproduction characteristics, wherein at portions of the image having a state transition said state determination rules favoring a first state over a second state when a control field of adjacent pixels including said central pixel in said formation are at a second state, said state determination rules further tending to favor a first state of a second state if said control field comprises at least four adjacent pixels including said central pixel; and applying said determined binary pixel state to each of said symmetrically unique pixels, producing controlled dilation of image fields at said first state compensating for said second reproduction characteristics at said second resolution.

7. The method of claim 6, wherein said first reproduction characteristics include line thickening characteristics and said second reproduction characteristics include line thinning characteristics, and said compensation for said second reproduction characteristics includes favoring line thickening.

8. The method of claim 7, wherein said first state is black, and said second state is white, said state determination rules tending to favor controlled dilation of black fields at said second magnified resolutions.

* * * * *